United States Patent [19]

Heisler et al.

[11] Patent Number: 5,650,822
[45] Date of Patent: Jul. 22, 1997

[54] PROCESS FOR SOURCE CODING

[75] Inventors: Philipp Heisler; Stefan Goss, both of Hildesheim, Germany

[73] Assignee: Robert Bosch GmbH, Stuttgart, Germany

[21] Appl. No.: 392,660

[22] Filed: Feb. 23, 1995

[30]  Foreign Application Priority Data

Feb. 23, 1994  [DE]  Germany .................. 44 05 803.9

[51] Int. Cl.$^6$ ................ H04N 7/36; H04N 7/50
[52] U.S. Cl. ............. 348/402; 348/416; 348/423
[58] Field of Search ................ 348/402, 416, 348/423; H04N 7/36, 7/50

[56]  References Cited

U.S. PATENT DOCUMENTS

| | | | |
|---|---|---|---|
| 4,591,909 | 5/1986 | Kuroda | 348/415 |
| 5,347,311 | 9/1994 | Golin | 348/416 |
| 5,394,196 | 2/1995 | Robert | 348/416 |
| 5,440,346 | 8/1995 | Alattar | 348/416 |
| 5,488,430 | 1/1996 | Hong | 348/416 |
| 5,510,839 | 4/1996 | Hamano | 348/423 |

OTHER PUBLICATIONS

D. Biere, "Transmission of Moving and Still-Images in Highly Disturbed Narrow-band Channels Using the Radio Videophone," Bosch Technical Reports, Isssue 54, 1991, p. 35 et seq.
Stiller, "Motion Estimation for Coding of Moving Video at 8 Kbit/s with Gibbs Modeled Vectorfield Smoothing," Proc. SPIE, vol. 1360, 1990, pp. 468–476.

Primary Examiner—Howard W. Britton
Attorney, Agent, or Firm—Kenyon & Kenyon

[57]  ABSTRACT

A process for source coding which divides image areas of an image, by use of a set of image statistics, into image areas to be intraframe-coded and interframe-coded and, by use of a movement estimation, additionally determines the image areas as foreground or as background. In the course of coding, in the first instance the image areas which belong to the foreground and are to be intraframe-coded are processed. Subsequently, the image areas which belong to the foreground and are to be interframe-coded are coded. Next, the image areas which belong to the background and are to be intraframe-coded are coded. Finally, the image areas which belong to the background and are to be interframe-coded are transmitted until the available data rate has been used up.

5 Claims, 3 Drawing Sheets

PROCESS FOR SOURCE CODING

FIELD OF THE INVENTION

The present invention relates to a process for the source coding of images.

BACKGROUND INFORMATION

A process for the source coding of images is already known from D. Biere "Transmission of Moving and Still Images in Highly Disturbed Narrow-band Channels Using the Radio Videophone," Bosch Technical Reports, Issue 54, 1991, page 35 et seq. In this process, an image is transmitted by means of coding of the prediction error pattern and by means of block-oriented movement estimation. Using block-oriented movement estimation, a vector field is determined, which is reprocessed using a model-based algorithm. The determined movement vectors and the corresponding contours of moving image areas are in the first instance transmitted in coded form.

In accordance with the remaining residual data rate, still deviating block contents are intraframe-coded or interframe-coded and transmitted. To determine the image areas which are intraframe-coded, the variance of the image signal within an image area is compared with a variable threshold. If the variance is smaller than the variable threshold, then the image area is intraframe-coded and transmitted. The remaining image areas are subjected to a three-stage adaptive quantization and, after a further block subdivision, structure-coded and transmitted.

SUMMARY OF THE INVENTION

The process according to the present invention has the advantage that the image areas which are to be intraframe-coded or interframe-coded are divided into foreground and background. In the first instance, the image areas which belong to the foreground and are intraframe-coded are transmitted. Subsequently, the image areas which belong to the foreground and are interframe-coded are transmitted. Later on, the image areas which belong to the background and are intraframe-coded and the image areas which belong to the background and are interframe-coded are transmitted.

Thus, in the first instance, the image areas which belong to the foreground and are of greater importance to the observer of the image than the image areas which belong to the background are transmitted. Accordingly, a subjectively better image quality is perceived by an observer. The image quality according to the method of the present invention is further improved in that an image area which was determined as foreground is still treated as foreground for a specified time, although the movement estimation has already determined the image area as background.

It is also advantageous to allocate a specified value to the image areas which belong to the foreground and to increase the value of image areas by a specified amount at specified time intervals if the image areas have been determined as background, and to treat the image area as background only when the value of an image area has exceeded a specified threshold. Thus, the management of the image areas is made possible in a simple manner by the comparison of numerical values.

An additional improvement in the image quality is achieved according to the method of the present invention in that the specified amount by which a specified value of an image area is increased is dependent upon the mean movement vector of the image area. Thus, the dynamic range of the image areas is taken into consideration in the course of coding and a further improvement in the image quality is attained.

Furthermore, it is advantageous to treat an image area of the background which is recognized as foreground in the movement estimation immediately as foreground. In this manner, moving image areas are in general coded with improved image quality.

DETAILED DESCRIPTION OF THE INVENTION

Figure 1:
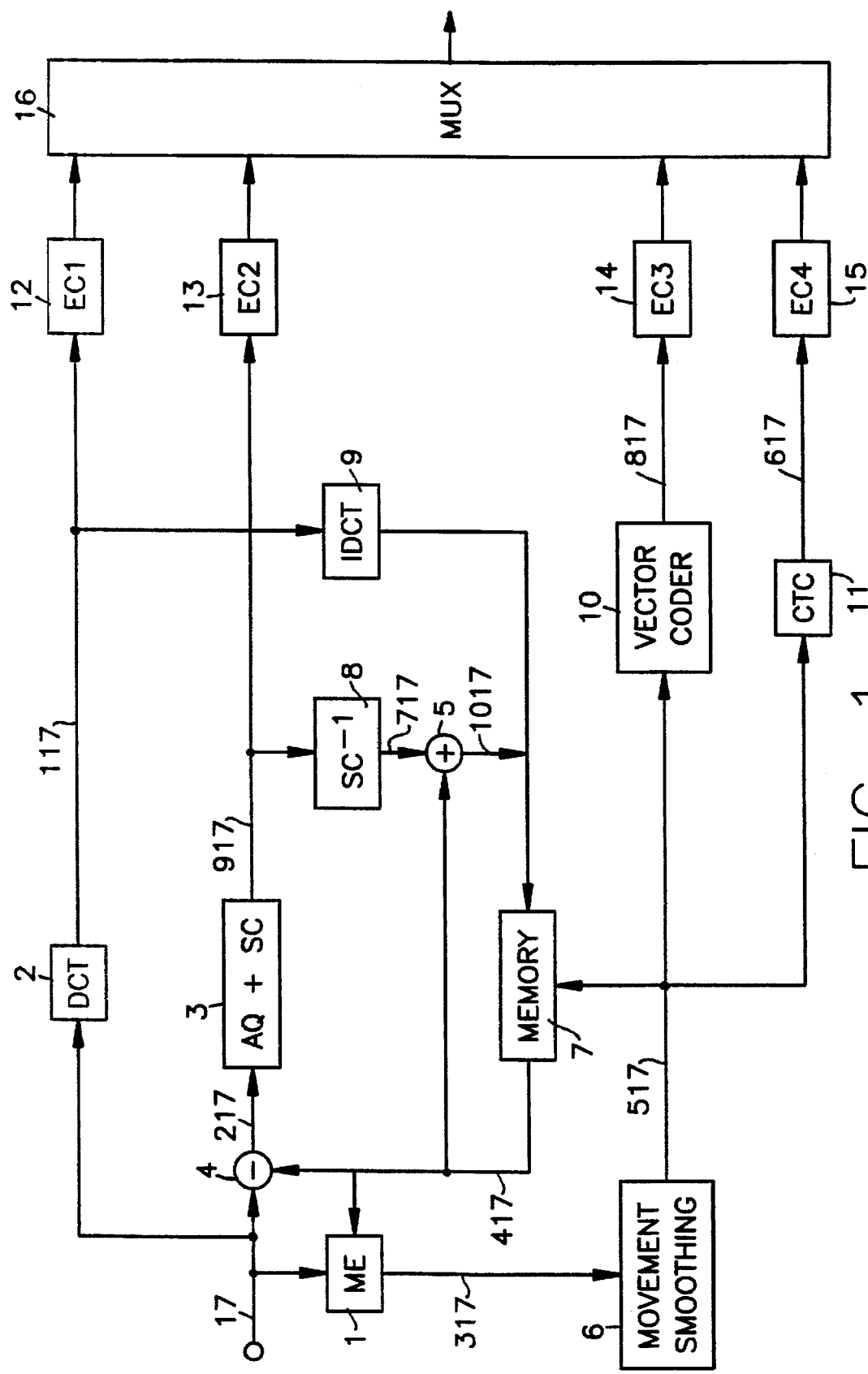
FIG. 1 diagrammatically shows the mode of operation of an image source coder according to the method of the present invention.

FIG. 1 shows a movement estimation unit 1, to which an input signal is fed via a data line 17. The input signal is at the same time fed to a discrete cosine transformer 2 and to a subtractor 4. The discrete cosine transformer 2 is connected via a data line 117 to a first entropy coder 12 and an inverse discrete cosine transformer 9. The subtractor 4 is connected to a data line 217 carrying an adaptive quantizer and structure coder 3.

The adaptive quantizer and structure coder 3 is connected via a data line 917 to an inverse structure coder 8 and a second entropy coder 13. The inverse structure coder 8 is connected via a data line 717 to an adder 5. The output of the inverse discrete cosine transformer 9 is connected to a prediction memory 7. The adder 5 is likewise connected, via a data line 1017, to the prediction memory 7.

The movement estimation unit 1 is connected by one output, via a data line 317, to a movement smoothing unit 6. The output of the movement smoothing unit 6 is connected via a data line 517 to the prediction memory 7, a prediction vector coder 10 and a contour coder 11. The prediction vector coder 10 is connected by its output, via a data line 817, to a third entropy coder 14. The contour coder 11 is connected via a data line 617 to a fourth entropy coder 15. The first, the second, the third and the fourth entropy coder 12, 13, 14, 15, respectively, are connected via data lines to a data multiplexer 16. The output of the prediction memory 7 is connected via data lines 417 to the adder 5, the subtractor 4 and the movement estimation unit 1. The data multiplexer 16 is connected to a data channel.

The arrangement of the present invention according to FIG. 1 operates as follows: a moving image is fed to the movement estimation unit 1. The moving image is divided into image units. For each image unit, the movement estimation unit 1 carries out an estimation of the movement between the moving image and a prediction image filed in the prediction memory 7. In this case, for example, the criterion of the mean square deviation of an image area at various positions within a prescribed window of 40×40 pixels in the prediction image is minimized. The movement estimation unit 1 gives, as the result, one displacement vector per image unit.

The movement estimation unit 1 also gives a diffuse displacement vector field for the entire moving image, since not the determination of the true object movement, but rather the minimization of the mean square deviation, was utilized as a criterion. The vector field determined by the movement estimation unit 1 is fed to the movement smoothing unit 6. Using the correlations of the displacement vectors of spatially adjacent image units, the movement smoothing unit 6 determines a more homogeneous movement vector field. In this case, the following formula (1) is used to examine the homogeneity of the movement vectors and thus to examine the image homogeneity:

$$P(V) = e^i = -\sum_{1}^{M} C_i, \quad (1)$$

where $C_i = g_i * |v_k - v_i|$, $g_i = 1$ for the direct neighbors (left, right, above and below), $g_i = 1/\sqrt{2}$ for the diagonal neighbors, $|v_k - v_i|$ represents the difference in length between the movement vector vk under consideration, and an adjacent movement vector $v_i$, and is computed in the following manner: $(v_{kx} - v_{ix})^2 + (v_{ky} - v_{iy})^2$.

In this case, $v_{kx}$ and $v_{ix}$ represent the components of the movement vectors in a specified x direction lying in the image plane, and $v_{ky}$ and $v_{iy}$ represent the components of the movement vectors in a y direction standing in the image plane and at a 90° angle to the x direction. The variable M indicates the number of adjacent movement vectors which are taken into consideration. The variables $g_i$ are weighting constants which are selected as a function of the application.

With the aid of formula (1), a quantity P(V) is computed, which is proportional to the differences in length between the movement vector under consideration and the adjacent movement vectors. As a function of P(V), a smoothing of the movement vector field is carried out using a Gibbs distribution. To this end, for example, P(V) is compared with a prescribed quantity and, if the quantity is exceeded, a smoothing is carried out. The smoothing described represents a known process and is described, for example, in Stiller, "Motion Estimation for Coding of Moving Video at 8 kbit/s with Gibbs Modeled Vectorfield Smoothing", Proc. SPIE Lausanne, 1990, pages 468–476.

The smoothed movement vector field is onward-transmitted by the movement smoothing unit 6 to the prediction vector coder 10 and the contour coder 11. The prediction vector coder 10 determines a spatially predictive coding of the movement vectors using adjoining image units. In this case, determination takes place of image areas which include continuous image units and the displacement of which in comparison with the prediction image can be described by one movement vector. The contour coder 11 determines the contours of these image areas. The prediction vector coder 10 onward-transmits the predictively coded movement vectors to the third entropy coder 14. The third entropy coder 14 subjects the predictively coded movement vectors to an entropy coding and subsequently onward-transmits these to the data multiplexer 16. The contour coder 11 onward-transmits the determined contour, in the form of a binary mask, to the fourth entropy coder 15. The fourth entropy coder 15 subjects the binary mask to an entropy coding and subsequently onward-transmits this to the data multiplexer 16.

The image in the prediction memory 7 is displaced by the determined movement vectors.

The described image source coder operates in accordance with the principle of forward-acting control, i.e. prior to the coding of an image an assumption is made, based on the coding of the preceding images, as to which image areas can be transmitted on the basis of the available data rate. After subtraction of the data rate for attributes and movement information from the mean data rate, there remains a residual data rate for the prediction error coding of an image. By means of a threshold value decision, each image unit receives the attribute code intraframe, code interframe or repeat unchanged.

A computer unit determines the image units, the mean square deviation of which is in excess of a prescribed threshold. The discrete cosine transformer 2 subsequently carries out an intraframe coding for those image units, the variance of which is in excess of the specified threshold and subsequently onward-transmits these to the first entropy coder 12. The first entropy coder 12 subjects the intraframe-coded image units to an entropy coding and subsequently onward-transmits these to the data multiplexer 16. The discrete cosine transformer 2 also onward-transmits the intraframe-coded image units to the inverse discrete cosine transformer 9. The inverse discrete cosine transformer 9 subjects the intraframecoded image units to an inverse discrete cosine transformation and subsequently onward-transmits these to the prediction memory 7. The image units, the mean square deviation of which is below the prescribed threshold, are interframe-coded.

To determine interframe-coded image units, the image signals of an image unit are fed to a subtractor 4. In addition, an already movement-compensated prediction image is fed from the prediction memory 7 to the subtractor 4. The difference obtained from the fed image signal and the prediction image is onward-transmitted to the adaptive quantizer and structure coder 3. The difference image signal is subjected to an adaptive quantization and subsequently structure-coded. After the adaptive quantizer and structure coder, the image signal is fed to the second entropy coder 13 and the inverse structure coder 8. The second entropy coder 13 subjects the structure-coded image signal to an entropy coding and subsequently onward-transmits this signal to the data multiplexer 16.

The inverse structure coder 8 subjects the fed image signal to an inverse structure coding and subsequently onward-transmits this signal to the adder 5. The adder 5 adds the prediction image and the quantized difference image signal to form a new prediction image.

Figure 2:
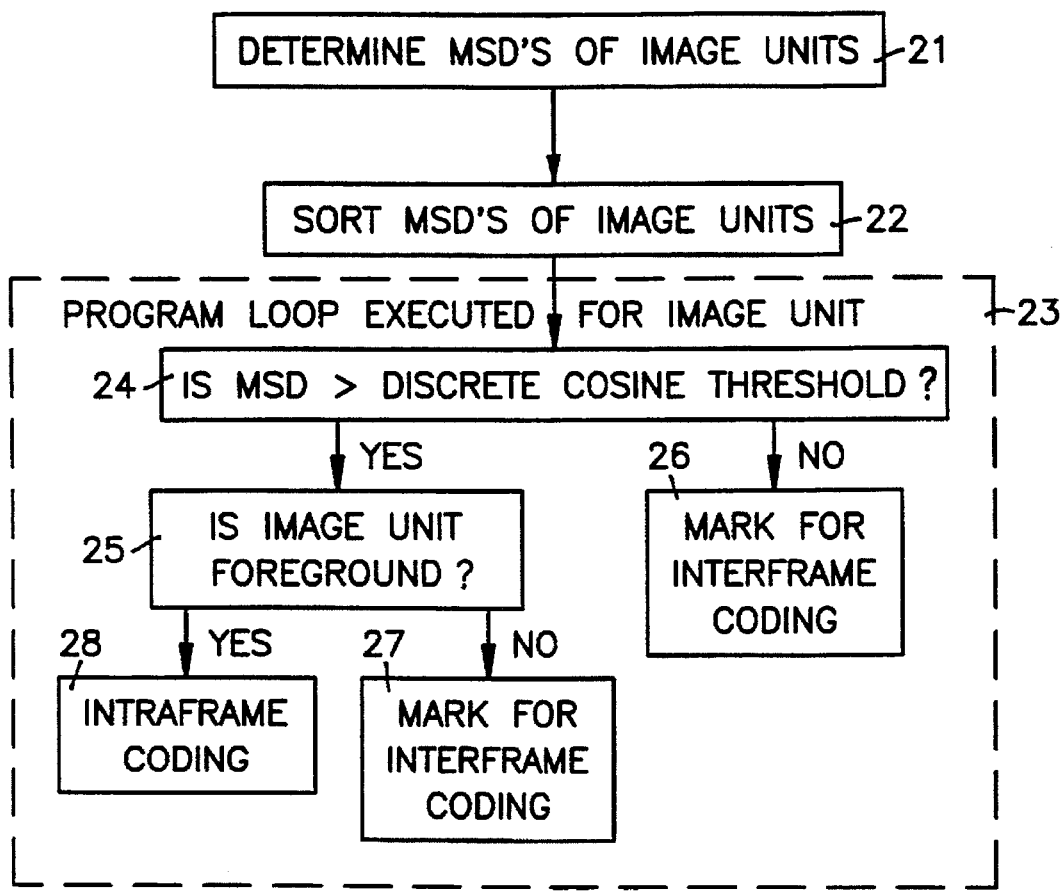
FIG. 2 is a diagrammatic program sequence for the determination of the image areas which are intraframe-coded and belong to the foreground according to the method of the present invention.

FIG. 2 shows a diagrammatic program sequence for the determination of the image units which belong to the foreground and are intraframe-coded. At program point 21, the mean square deviations of all image units relative to the prediction image are determined and filed, for each image unit, in a memory. Subsequently, at program point 22, the image units are sorted in descending order as a function of the magnitude of the mean square deviations. Thereupon, at program point 23, a program loop is executed over all image units.

At program point 24, this program loop includes the interrogation as to whether the mean square deviation of an image unit is greater than a specified discrete cosine transformation threshold. If this is not the case, then branching takes place to program point 26 and this image unit is marked as an image unit to be interframe-coded in a binary mask and filed in a memory. However, if the interrogation at program point 24 reveals that the mean square deviation is greater than the specified discrete cosine transformation threshold, then branching takes place to program point 25.

At program point 25, the interrogation takes place as to whether the image unit belongs to the foreground. The image unit belongs to the background if the displacement vector determined by the movement estimation unit 1 is equal to zero. If the image unit belongs to the background, then branching takes place to program point 27 and this image unit is marked as an image unit to be interframe-coded in the binary mask and is filed in the memory. However, if the interrogation at program point 25 reveals that the image unit belongs to the foreground, then this image unit is marked, at program point 28, as an image unit to be intraframe-coded in the binary mask and is filed in the memory.

The program according to the present invention shown in FIG. 2 determines the image units which are to be intraframe-coded. Intraframe coding takes place only of the image units which belong to the foreground and the mean square deviation of which is greater than a specified discrete cosine transformation threshold.

Figure 3:
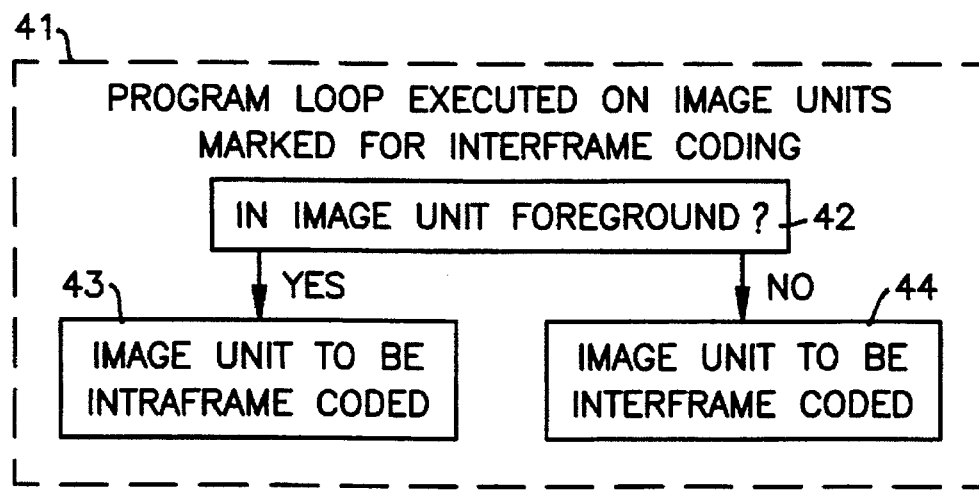
FIG. 3 shows a diagrammatic program sequence for the determination of the image areas which belong to the foreground and are to be interframe-coded according to the method of the present invention.

FIG. 3 shows a diagrammatic program sequence which further processes the image units which have been determined by the program of FIG. 2 as image units to be interframe-coded.

At program point 41, a program loop begins which is executed over all image units. At program point 42, the interrogation takes place as to whether the image unit to be interframe-coded belongs to the foreground. If this is not the case, then branching takes place to program point 44 and this image unit is finally considered as an image unit to be interframe-coded. However, if the interrogation at program point 42 reveals that the image unit belongs to the foreground, then branching takes place to program point 43 and this image unit is marked as an image unit to be intraframe-coded. This interrogation is executed over all image units of an image. The program according to FIG. 3 determines image units which are to be intraframe-coded from the image units to be interframe-coded which are determined according to the program of FIG. 2, if these belong to the foreground.

Figure 4:
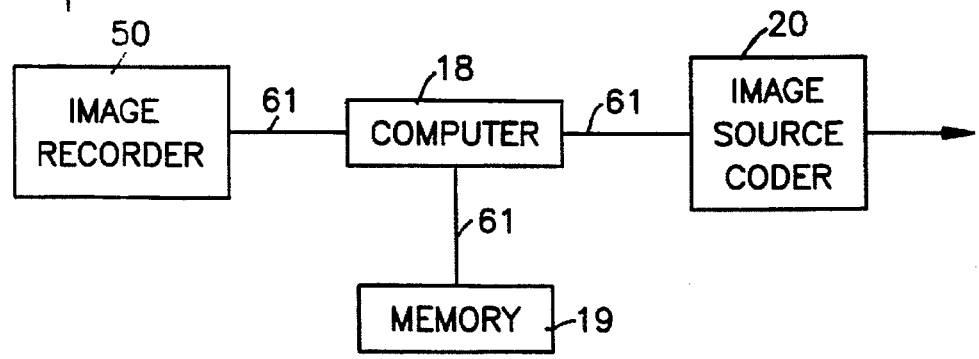
FIG. 4 illustrates a program sequence of an image source coding according to the method of the present invention.

FIG. 4 shows an image recording unit 50, which is connected via a data line 61 to a computer unit 18. The computer unit 18 is connected via a data line 61 to a memory 19. In addition, the computer unit 18 is connected via a further data line 61 to an image source coder 20. The image source coder 20 is constructed as diagrammatically shown in FIG. 1 and is connected to a data channel.

Figure 5:
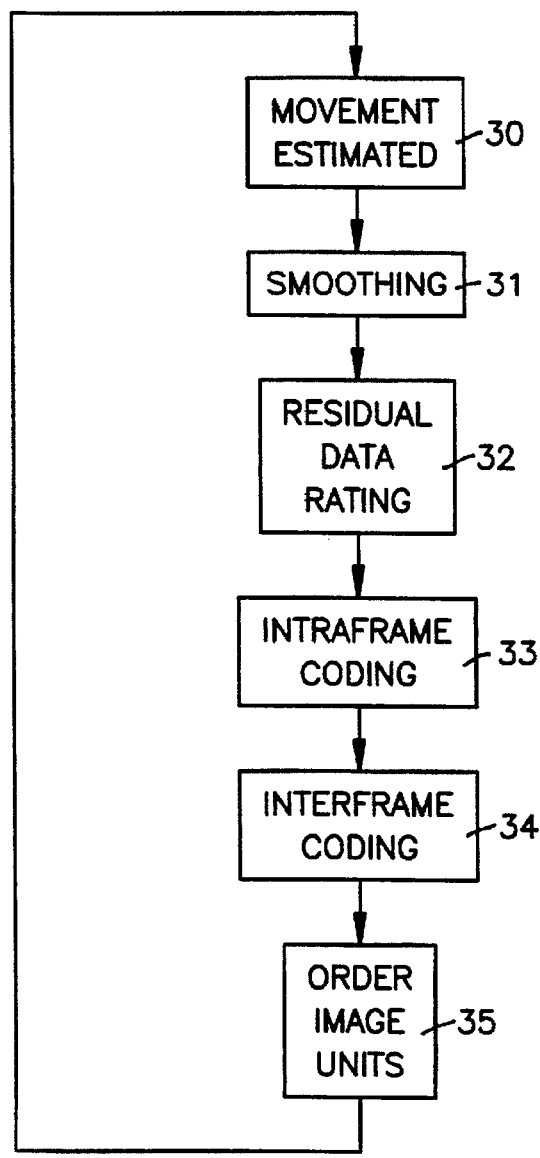
FIG. 5 shows an arrangement for image source coding according to the method of the present invention.

A specific embodiment is described hereinbelow with reference to the program sequence of FIG. 5 and with the inclusion of FIGS. 1 to 4. At program point 30 of FIG. 5, an image is divided by a computer unit 18 into image units of the size 8×8 pixels and fed to the movement estimation unit 1. The movement estimation unit 1 carries out, for each image unit, an estimation of the movement by comparison of the image with a prediction image fed from the prediction memory 7. By way of criterion, for example, the mean square deviation of the image at various positions within a prescribed window of 40×40 pixels in the prediction image is minimized. As the result, one displacement vector is obtained per image unit. The computer unit 18 files in a memory 19 a binary mask in which the image units which exhibit a movement vector not equal to zero are marked. In order to improve the image quality, at program point 31 the displacement vectors determined by the movement estimation unit 1 are smoothed by the movement smoothing unit 6, assuming a Gibbs distribution (formula (1)) and are transmitted by means of predictive movement vector coding and contour coding, as shown in FIG. 1.

Subsequently, at program point 32, the computer unit 18 determines the residual data rate which is available for the transmission of the image. The residual data rate is obtained from the total data rate per image minus the consumed data rate for the transmission of the movement vectors and of the contours associated therewith minus the consumed data rate for attributes. The attributes indicate the mode of coding for each image unit. The available residual data rate is used for the intraframe coding or interframe coding. The intraframe coding is executed by means of discrete cosine transformation. The interframe coding, i.e. the difference of an image unit of a current image from a movement-compensated prediction image, is in the first instance adaptively quantized and subsequently structure-coded.

At program point 33, using the program shown in FIG. 2, a determination takes place of the image units of the image which are intraframe-coded and belong to the foreground. To this end, the computer unit 18 makes a comparison as to whether the mean square deviation of an image unit is greater than a specified threshold and checks, with reference to the binary mask which is filed in the memory 19, whether the movement vector of the image unit is greater than zero. The computer unit 18 orders the image units according to the mean square deviation, multiplied by a factor PF-intra, which is equal to 1 for image units of the foreground and is equal to zero for image units of the background, as a function of their magnitude.

At program point 34, according to the program of FIG. 3, determination takes place of the image units which are to be interframe-coded and belong to the foreground. The computer unit 18 orders the image units as a function of their mean square deviations, multiplied by a factor PF-inter. The factor PF-inter is equal to 1 for foreground image units and is variably time-dependent for background image units. Subsequently, at program point 35, the computer unit 18 orders all image units as a function of their mean square deviations, multiplied by the appropriate factors PF-intra or PF-inter. The image units are now transmitted, coded in sequence by the greatest product of the mean square deviation and the factor PF-intra or PF-inter corresponding to FIG. 1, until such time as the residual data rate for the transmission of the image has been used up.

The factor PF-inter for image areas of the background is preferably time-dependent, so that a stepwise lowering of the factor PF-inter as a function of time is provided.

The binary mask which is applied by the computer unit 18 in the memory 19 for the specification of a moving image unit can in the simplest case be occupied by binary values. This means that an image unit, the displacement vector of which is equal to zero, is given, for example, the value zero and an image unit I, the displacement vector of which is not equal to zero, is given the value 1. Preferably, the image units can be occupied by a specified numerical value $Z_I$. $Z_I$ is set at zero if for the image unit I a movement has been determined and the image unit belongs to the foreground. In the other case, $Z_I$ is increased by a specified amount B per time cycle: $Z_I(t+1)=(Z_I(t)+B)$, where t represents a specified time cycle.

If the numerical value $Z_I$ of an image unit I exceeds a constant specified threshold S, then the image unit I is allocated to the background until such time as the movement estimation unit 1 again records a displacement vector not equal to zero for the image unit I and $Z_I$ is thus set to zero. As a result of this threshold value operation, the foreground/background transition is delayed for image units having movement vectors of the length zero. The background/foreground transition takes place immediately, however, for movement vectors not equal to zero. For the computation of the specified amount B, use is made, for example, of the mean movement vector length according to the following formula:

$$L_m = (1/(2*n)) * \sum_{i=1}^{n} (X_1 + Y_1),$$

where n=number of vectors which are not zero vectors in the current image, $X_i$, $Y_i$=length of the vectors in the X direction and Y direction The amount B is then:

$$B = L_m * L_m$$

The binary mask can be further processed by means of the known processes erosion and dilation.

The mean square deviation is preferably computed according to the following formula:

$$MSE = (1/n) * \sum_{i=1}^{n} (org_i - pre_i)^2$$

in which:

n=number of pixels in the block i=sequential index over all pixels of a block $org_i$=i-th pixel in the original block $pre_i$=i-th pixel in the block of the preceding image.

What is claimed is:

1. A method for source coding a plurality of images, comprising the steps of:

dividing each of the plurality of images into an image area having a predetermined size;

determining a set of image statistics for each image area;

sorting each image area as a function of the set of image statistics for the image area;

if the set of image statistics for the image area is at least as great as a first predetermined threshold value, marking the image area for intraframe-coding;

if the set of image statistics for the image area is less than the first predetermined threshold value, marking the image area for interframe-coding;

classifying each image area as representing one of a foreground and a background as a function of a movement estimation determination; and coding the image areas, wherein the image area to be intraframe-coded has priority over the image area to be interframe-coded, and the image area classified as representing the foreground has priority over the image area classified as representing the background.

2. The method according to claim 1, wherein when the image area represents the background and the movement estimation determination classifies the image area as representing the foreground, the image area is immediately classified as representing the foreground.

3. The method according to claim 1, wherein when the image area represents the foreground and the movement estimation determination classified the image area as representing the background, the image area is processed as representing the foreground for a predetermined duration of time.

4. The method according to claim 3, further comprising the steps of:

allocating a first predetermined value to the image area that is classified as representing the foreground;

filing the first predetermined value in a memory; and when the image area is classified as representing the background, increasing the first predetermined value stored in the memory by a second predetermined value at a predetermined time interval to form a stored amount, wherein the image area is treated as background only when the stored amount exceeds a second predetermined threshold value.

5. The method according to claim 4, wherein the second predetermined value is determined as a function of a mean movement vector of the image area, the mean movement vector being determined as a function of the movement estimation determination.

* * * * *